C. I. KAGEY & F. W. STONEBURNER.
BAKING-PAN.
No. 191,059. Patented May 22, 1877.
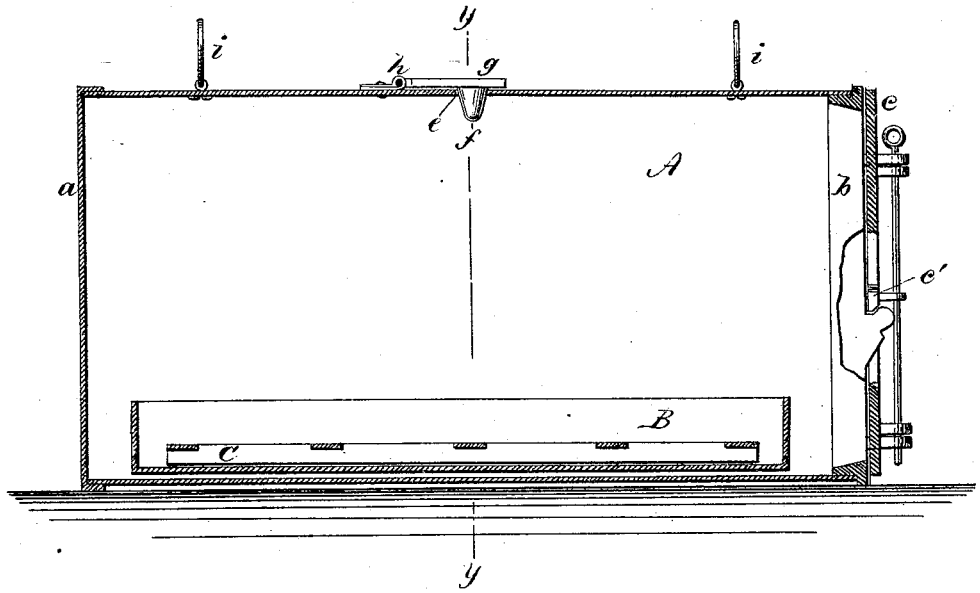
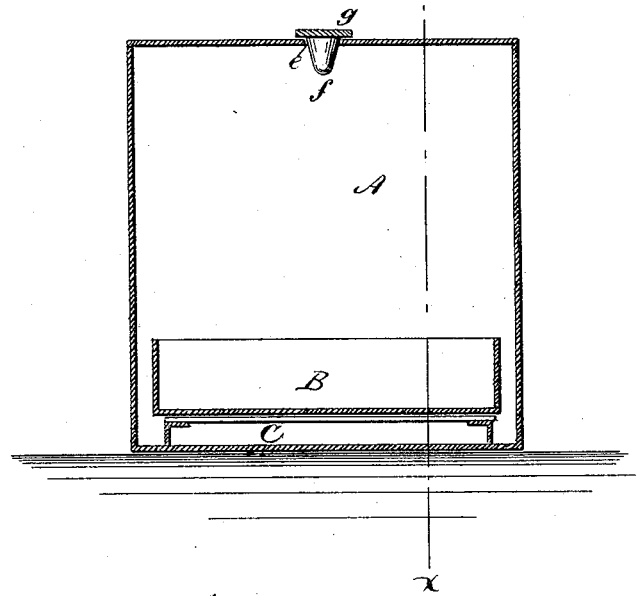
WITNESSES:
J. H. Scarborough
Chas. Nida
INVENTORS
C. I. Kagey
F. W. Stoneburner
BY
ATTORNEYS.

UNITED STATES PATENT OFFICE.

CHARLES I. KAGEY AND FRED W. STONEBURNER, OF ARCOLA, ILLINOIS.

IMPROVEMENT IN BAKING-PANS.

Specification forming part of Letters Patent No. 191,059, dated May 22 1877; application filed April 9, 1877.

*To all whom it may concern:*

Be it known that we, CHARLES I. KAGEY and FRED W. STONEBURNER, of Arcola, in the county of Douglas and State of Illinois, have invented a new and Improved Roaster, of which the following is a specification:

Figure 1 is a longitudinal section on line $x\ x$ in Fig. 2. Fig. 2 is a transverse section on line $y\ y$ in Fig. 1.

Similar letters of reference indicate corresponding parts.

The object of our invention is to provide a compact portable device for roasting and baking.

Referring to the drawing, A is the body of the roaster, which is made of sheet-iron, and is rectangular in form.

To one end of the body A a cap, $a$, is secured, and to the other end a rectangular cast-iron frame, $b$, is fitted, to which a cast-iron door, C, is hinged. This door is provided with a projection, $c'$, which engages a catch, $d$, formed on the frame $b$, when the door is closed.

A roasting or baking pan, B, is provided, and, also, a broiling-grate, C, both of which are used in conjunction when either broiling or baking.

When baking is to be done the pan B is placed upon the broiling-grate, as shown in Fig. 2, and when broiling is to be done the broiling-grate C is placed in the pan B, as shown in Fig. 1.

At the top of the roaster, at or near its center, an aperture, $e$, is made, which is closed by a tapering projection, $f$, that extends downward from a plate, $g$, that is hinged to the top of the roaster at $h$. Rings $i\ i$ are attached to the top of the roaster near each end, for convenience in handling.

The apparatus, when in use, is placed upon a stove or in an oven. The escape of steam from the article being cooked is controlled entirely by opening or closing the aperture at the top of the roaster.

The advantage claimed for the invention is, that the juices and flavor of the article being cooked are retained, and it is thoroughly and evenly affected by the heat.

Having thus described our invention, we claim as new and desire to secure by Letters Patent—

The sheet-iron body A, having the rings $i$ and ventilating-aperture $e$, the cast-iron frame $b$ and door $c$, and the hinged cap $g$, having the projection $f$, in combination, substantially as shown and described.

CHARLES I. KAGEY.
FRED W. STONEBURNER.

Witnesses:
 A. D. KAGA,
 W. A. HUMPHREY.